United States Patent
Ilany et al.

(10) Patent No.: US 11,533,182 B2
(45) Date of Patent: Dec. 20, 2022

(54) IDENTITY-BASED SECURITY PLATFORM AND METHODS

(71) Applicant: Portshift Software Technologies LTD., Tel Aviv-Jaffa (IL)

(72) Inventors: Ran Ilany, Hod Hasharon (IL); Alexei Kravtsov, Petah Tikva (IL); Ophir Setter, Ramat Gan (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 351 days.

(21) Appl. No.: 16/811,435

(22) Filed: Mar. 6, 2020

(65) Prior Publication Data
US 2020/0287723 A1 Sep. 10, 2020

Related U.S. Application Data

(60) Provisional application No. 62/814,434, filed on Mar. 6, 2019.

(51) Int. Cl.
*H04L 9/32* (2006.01)
*G06F 9/455* (2018.01)
*G06F 21/60* (2013.01)
*G06F 8/61* (2018.01)

(52) U.S. Cl.
CPC .............. *H04L 9/3247* (2013.01); *G06F 8/61* (2013.01); *G06F 9/45558* (2013.01); *G06F 21/602* (2013.01); *H04L 9/3242* (2013.01); *G06F 2009/45587* (2013.01)

(58) Field of Classification Search
CPC ....... H04L 9/3247; H04L 9/3242; G06F 8/61; G06F 9/45558; G06F 21/602; G06F 2009/45587

USPC .......................................................... 713/165
See application file for complete search history.

(56) References Cited

U.S. PATENT DOCUMENTS

| | | | | |
|---|---|---|---|---|
| 5,638,446 A * | 6/1997 | Rubin | ............... | H04L 9/3263 713/176 |
| 6,959,382 B1 * | 10/2005 | Kinnis | ............... | H04L 9/3247 713/168 |
| 2002/0019932 A1 * | 2/2002 | Toh | ............... | H04L 63/061 713/155 |
| 2005/0039016 A1 * | 2/2005 | Aissi | ............... | H04L 63/123 713/176 |
| 2007/0168657 A1 * | 7/2007 | Carro | ............... | G06F 21/645 713/176 |

(Continued)

*Primary Examiner* — Michael S McNally
(74) *Attorney, Agent, or Firm* — Baker Botts, LLP (57) ABSTRACT

A method and system for securing instantiates. The method includes determining at least one signable file among a plurality of files of an instantiate, wherein determining the at least one signable file further comprises classifying each of the plurality of files with respect to whether the file is changed at runtime; signing each of the at least one signable file to create at least one first signature, wherein signing the plurality of files further comprises computing a cryptographic hash for each file, wherein each encrypted hash is signed using a private key; and verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

19 Claims, 5 Drawing Sheets

(56) References Cited

U.S. PATENT DOCUMENTS

| | | | |
|---|---|---|---|
| 2017/0134392 A1 | 5/2017 | Chattopadhyay et al. | |
| 2017/0134476 A1 | 5/2017 | Palanivel et al. | |
| 2020/0285483 A1* | 9/2020 | Callaghan | G06F 21/575 |
| 2021/0326413 A1* | 10/2021 | Mallon | H04L 9/06 |

* cited by examiner

IDENTITY-BASED SECURITY PLATFORM AND METHODS

CROSS-REFERENCE TO RELATED APPLICATIONS

This application claims the benefit of U.S. Provisional Application No. 62/814,434 filed on Mar. 6, 2019, the contents of which are hereby incorporated by reference.

TECHNICAL FIELD

The present disclosure relates generally to cybersecurity, and more specifically to identity-based security techniques for protecting cloud applications.

BACKGROUND

Cloud computing platforms allow for remotely providing storage and computational resources. For example, cloud computing platforms have been utilized to store and retrieve vast amounts of data for various services or applications (also referred to cloud applications). The infrastructure of the cloud computing platform is a collection of networked systems typically including a large number of nodes distributed throughout one or more data centers in which each node provides a physical machine or a virtual machine running on a physical host.

Cloud computing platforms are ever-changing environments where applications, services, and virtual instances executing the same way, may be added, removed, scaled up, scaled down, or upgraded on demand. Due to the complexity of such platforms, operations related to resolving security incidents, deploying virtual instances, and implementing network control (or security) policies are performed by development operations (DevOps) personnel. This is a costly and inefficiently managed process.

Further, network control policies imposed on cloud computing platforms contribute to the challenges of incident management and deployment. In particular, many cloud computing platforms are subject to network control policies that limit access to certain data and, more specifically, limit the interactions between applications and services executed in the cloud computing platforms. Thus, these network control policies may contribute to sub-optimal performance of cloud-implemented applications and services.

Protecting a typical tenant environment in a cloud computing platform requires defining and managing of rules as part of the network control policies. Managing thousands of such rules with currently available tools creates complexity, blind spots, misconfigurations and a situation that is fundamentally impossible to manage at scale. Moreover, currently there are no practical solutions for controlling managed services or Application Programming Interface (API) keys.

Further, even properly defined and enforced policies cannot protect allowable connections or access to data. For example, applications can communicate with each other via unrestricted connections, thereby leaving the applications vulnerable to security breaches, malicious activity, or other cyber threats despite the enforcement of network control policies.

In addition, the network control policies may dynamically protect the virtual instances in the cloud computing application. The identifiers and network addresses of such instances constantly change. Further, in some cases, the network addresses may be masked or translated. Thereby, the actual address of a virtual instance needed to define or enforce a rule within such policy may not be apparent.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing instantiates. The method comprises: determining at least one signable file among a plurality of files of an instantiate, wherein determining the at least one signable file further comprises classifying each of the plurality of files with respect to whether the file is changed at runtime; signing each of the at least one signable file to create at least one first signature, wherein signing the plurality of files further comprises computing a cryptographic hash for each file, wherein each encrypted hash is signed using a private key; and verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

Certain embodiments disclosed herein also include a non-transitory computer readable medium having stored thereon causing a processing circuitry to execute a process, the process comprising: determining at least one signable file among a plurality of files of an instantiate, wherein determining the at least one signable file further comprises classifying each of the plurality of files with respect to whether the file is changed at runtime; signing each of the at least one signable file to create at least one first signature, wherein signing the plurality of files further comprises computing a cryptographic hash for each file, wherein each encrypted hash is signed using a private key; and verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

Certain embodiments disclosed herein also include a system for securing instantiates. The system comprises: a processing circuitry; and a memory, the memory containing instructions that, when executed by the processing circuitry, configure the system to: determine at least one signable file among a plurality of files of an instantiate, wherein determining the at least one signable file further includes classifying each of the plurality of files with respect to whether the file is changed at runtime; sign each of the at least one signable file to create at least one first signature, wherein signing the plurality of files further comprises computing a cryptographic hash for each file, wherein each encrypted hash is signed using a private key; and verify an identity of the instantiate using the at least one first signature, wherein verifying the identity of the instantiate further includes comparing the at least one first signature to the at least one second signature, wherein each of the at least one second signature is a signature of one of the at least one signable file at runtime.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include techniques for securing applications or other instantiates operable and executed in a cloud computing platform. The disclosed embodiments allow for such security without the need for a network control policy. To this end, the disclosed embodiments provide techniques for signing artifacts offline and verifying their signatures online. In an embodiment, the cloud application 131 may be signed at runtime, for example, when an access to the application is requested.

In an embodiment, signable files (e.g., execution and configuration files) of an application identity are signed. The application identity is an account that is used to run the application. The signing may occur offline and includes computing a cryptographic hash for each file. The computed hashes are signed using a private key to prevent tampering. At runtime, the application identity is verified. The application may be an application, a service, a function, or any virtual instance executed in a cloud computing platform.

In a further embodiment, the signable files include files that are typically not changed and, therefore, the signatures of those signable files will be possible to verify during execution. More specifically, if a file is typically changed, its signature at runtime will not match its original signature. It has been identified that certain types of files are not normally changed such that their signatures can be verified. Additionally, it has been identified that certain types of files are normally changed such that their signatures cannot be verified even though no impermissible changes were made. Thus, requiring verification of signatures for those normally changing files would result in false positives. To this end, the disclosed embodiments include techniques for classifying files in order to determine which files are signable.

The disclosed embodiments further allow for ensuring that signatures are not improperly changed without using a network control policy. More specifically, since only files that are known as unchanging are signed, the verification of signatures ensures that those files (and not files that are allowed to be changed) remain unchanged without requiring implementation of a network control policy preventing such changes.

Figure 1:
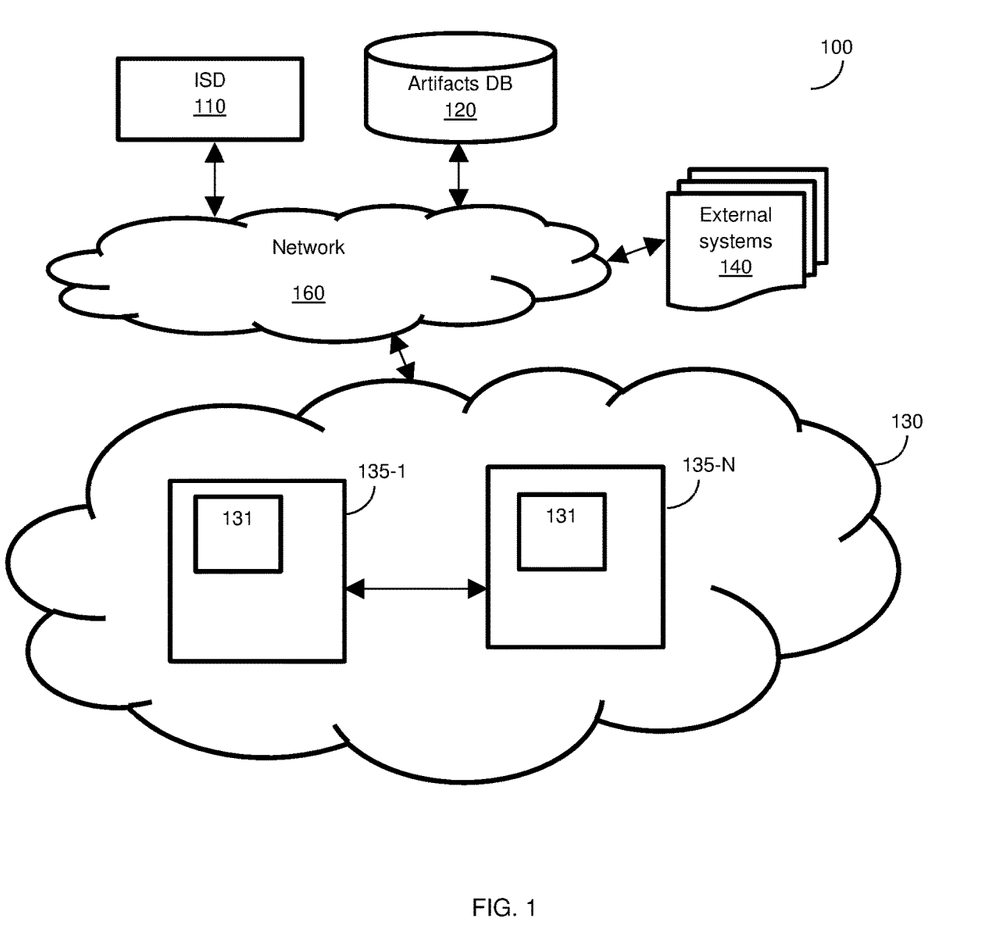
FIG. 1 is a network diagram utilized to describe various disclosed embodiments.

FIG. 1 illustrates an example network diagram 100 utilized to describe various disclosed embodiments. In the example network diagram 100, an identity signing device (ISD) 110 is connected to at least one artifacts database (DB) and a cloud computing platform 130 via a network 160. The network 160 may be, but is not limited to, a wireless, cellular or wired network, a local area network (LAN), a wide area network (WAN), a metro area network (MAN), the Internet, the worldwide web (WWW), similar networks, and any combination thereof.

In some configurations, the ISD 110 is further connected to external systems 140 via the network 160. The external systems 140 may include, but are not limited to, public repositories maintaining software packages and executable files. Examples for such systems may include CentOS Vault and Ubuntu Packages. The external systems 140 may include a data source maintaining classified artifacts as further explained below.

The artifacts database 120 may include any continuous integration (CI) tool, any continuous delivery (CD) tool, or a combination thereof. The artifacts database 120 is utilized for deployment, testing, and integration of software applications, services, or functions (collectively referred to as "cloud applications") implemented via the cloud computing platform 130.

The cloud computing platform 130 may include, but is not limited to, a public cloud, a private cloud, or a hybrid cloud. Examples for public cloud computing platforms may include Amazon Web Services™, Microsoft® Azure™, and Google® Cloud Platform™, and the like.

The cloud computing platform 130 may include a number of virtualized environments 135-1 through 135-N (where N is an integer having a value of 1 or greater) (collectively referred to as virtualized environments 135) that may or may not belong to a specific tenant (client). For example, the virtualized environment 135-1 may be a production environment, while the virtualized environment 135-2 may include the maintenance of sensitive personal information. The virtualized environments 135 host respective cloud applications 131.

According to the disclosed embodiments, some or all of the cloud applications 131 in each of the virtualized environments 135 are configured by having security-signed application identities. Each application identity is generated by the ISD 110 and includes securely signed images of an application 131. In some configurations, securely signed applications 131 communicate with each other over a point-to-point communication channel (not shown).

It should be appreciated that any application image securely signed by the ISD 110 is decoupled from any policy defined in the cloud computing platform 130. The process for securely signing a cloud application 131 is further decoupled from verification of the identity. In an embodiment, the cloud application 131 may be also signed at runtime, for example, when an access to the application is requested.

The ISD 110 is configured to securely sign the operating system (OS) files and artifacts of cloud application 131. In an embodiment, only a subset of such files and artifacts is signed and verified. In general, files that have frequently changed (e.g., above a threshold number of times in a given time period) or were allowed to be changed, are not signed. As such, when files are changed at runtime, their signatures during verification will be different than their signatures at time of initial signing. However, a change in signature does not necessarily indicate a change performed due to malicious activity. The determination of which files to sign and verify is performed based on heuristics.

The artifacts typically include executable files (e.g., libraries, scripts, software containers, etc.) that originated at an external source. These files are usually not changed and are contained in the basic image of a cloud application 131. The artifacts may further include runnable artifacts retrieved from the artifact database 120. These artifacts are the runtime or executable files developed by the customer and built during a CI process. The artifacts may further include configuration files, some of which can be changed during runtime and some of which cannot.

In an embodiment, distinguishing which artifacts should be signed is performed offline, that is, not during runtime of the application, in order to accelerate a verification process at runtime. It should be noted that in certain embodiments all types of artifacts can be signed using the process described herein.

The ISD 110 is configured to classify artifacts of a cloud application 131 as received from the artifact database 120 during a CI/CD phase. The classification, in one embodiment, is performed to identify artifacts that can be securely signed as "signable artifacts." The classification may be performed using a number of heuristics.

Following are some examples for classifying heuristics. As a first example, software packages received from the external systems 140 are mapped and indexed. Specifically, the configuration files within the software package are indexed and flagged. As a second example, a library such as Libmagic can be used to identify the type of files, hence artifacts. As a third example, the files with executable permissions are classified and indexed. As a fourth example, classification may be based on monitoring execution of files in a sandbox or during production. Any files opened for reading can be signed, whereas files that were opened for writing cannot be signed. It should be noted that any combination of the above heuristics can be utilized for classifications of artifacts.

The ISD 110 is configured to sign any artifact classified as a signable artifact. In an embodiment, the ISD 110 is further configured to spawn-up a machine in the CI/CD phase, allowing the signable artifacts and image OS to be securely signed. In an embodiment, the pairs of keys for signing the OS files and CI/CD are different, due to the frequency of their access and of their use. The signing of the artifacts is discussed in detail below.

It should be noted that the example implementation shown in FIG. 1 is described with respect to the nodes in a single cloud computing platform 130, a single ISD 110, and a single cloud application per virtualized environment 135 merely for simplicity purposes and without limitation on the disclosed embodiments. More or fewer cloud computing platforms, data centers, cloud applications, and the like, may be protected without departing from the scope of the disclosure.

Figure 2:
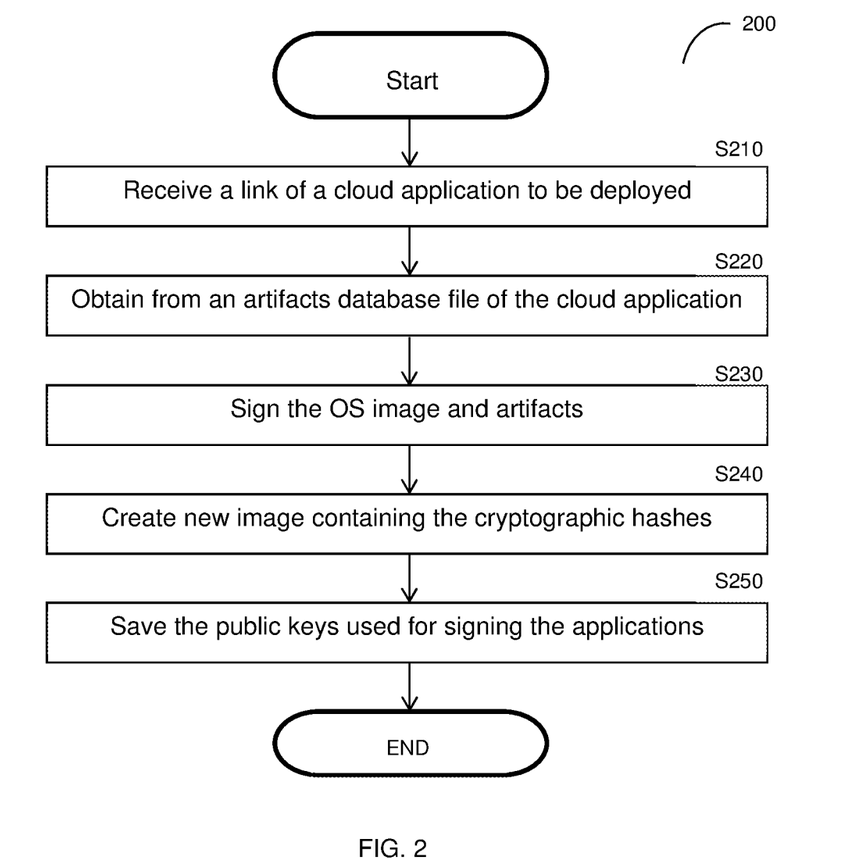
FIG. 2 is a flowchart illustrating a method for generating a secured application identity according to an embodiment.

FIG. 2 is an example flowchart 200 of a method for generating a secured application identity according to some embodiments. In an embodiment, the secured application identity includes signed artifacts and OS files of a cloud application.

At S210, a link of a cloud application to be deployed or integrated in the cloud computing platform is received. The link points to a location of the cloud application's files in an artifacts database.

At S220, files of the cloud application are obtained from an artifacts database (e.g., the artifacts database 120, FIG. 1). In an embodiment, an image of an operating system (OS) of a virtual machine that would execute the cloud application and artifacts of the cloud application are obtained together with their pairs of encryption keys. The OS image is a serialized copy of the entire state of the underlying machine stored in a file. The encryption keys are generated by a user (e.g., an administrator). It should be noted that there are two pairs of encryption keys: one for signing the OS image, and the other for signing the artifacts.

At S230, the OS image and the artifacts are signed using their respective pairs of encryption keys. In an embodiment, the OS image and the artifacts are signed separately from each other. The signing processes results in cryptographic hashes and CI/CD attributes of certain OS files and artifacts. The processes for signing the OS image and artifacts are discussed below.

In an embodiment, the OS image is signed as described below with respect to FIG. 3 and the artifacts are signed as described below with respect to FIG. 4. To this end, in an embodiment, S230 further includes determining whether each file of the OS image and of the artifacts is signable, that is, whether the file is classified as signable based on whether the file is typically changed at runtime. The determination is further discussed in FIGS. 3 and 4 below.

At optional S240, a new image containing the respective cryptographic hashes of the OS and of the signed artifacts is created. Alternatively or collectively, the cryptographic hashes may be saved in the ISD 110.

At S250, the public key of each signing pair of the encryption keys is saved in the ISD 110. Alternatively, a new certificate is generated for each such public key. The certificates are stored in the artifacts database 120. It should be noted that the certificates or the public keys are required to verify the cryptographic hashes and CI/CD attributes during runtime.

It should be noted that FIG. 2 is described with respect to a cloud application, but that the disclosed embodiments may be applicable to other instantiates without departing from the scope of the disclosure.

Figure 3:
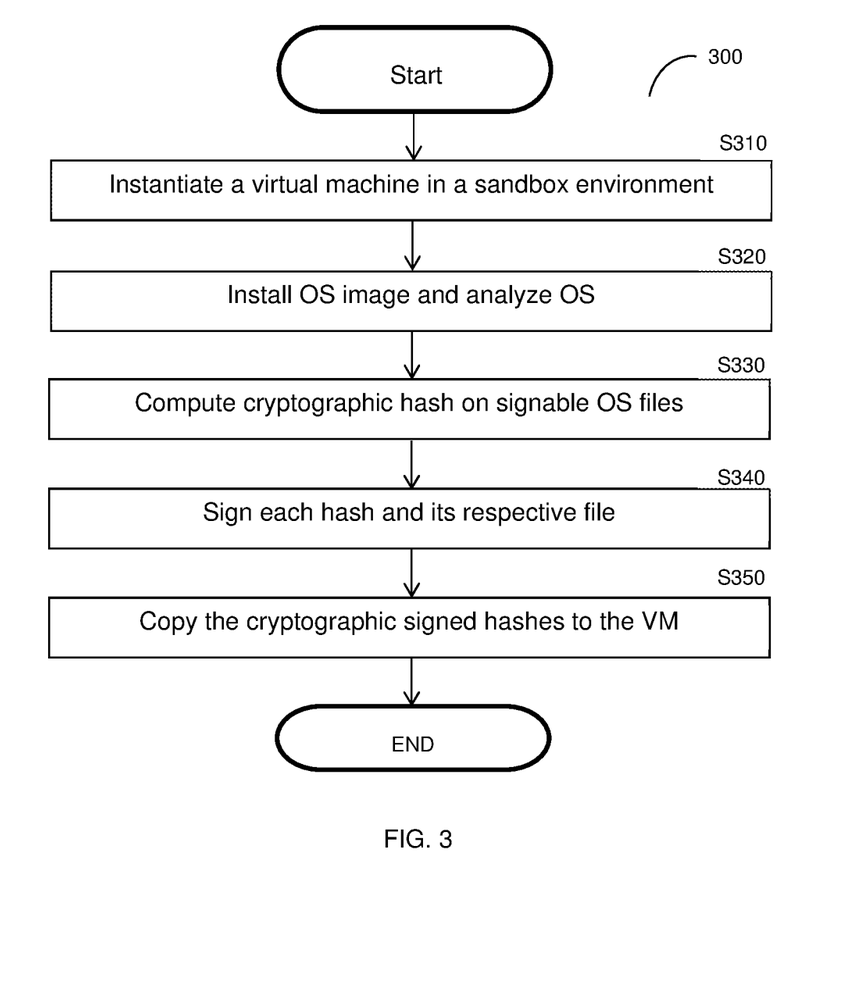
FIG. 3 is a flowchart illustrating a method for signing an operating system image according to an embodiment.

FIG. 3 is an example flowchart 300 illustrating a process for signing an OS image according to an embodiment.

At S310, a virtual machine is instantiated in a sandbox environment. In an embodiment, the virtual machine is utilized to simulate the location of the installed files post-installation. In an example implementation, the virtual machine is executed by the ISD 110 (FIG. 1).

At S320, an OS image is installed on the virtual machine such that the execution of the corresponding OS is analyzed. Specifically, the analysis includes determining which OS files are signable, i.e., can be signed. Example OS files that can be signed are discussed above.

At S330, a cryptographic hash is computed on each signable OS file. In an example implementation, S330 may be performed using cryptographic hash functions such as, but not limited to, secure hash algorithm (SHA), e.g., SHA-2, SHA-3, MD5, and the like.

At S340, the list of signed OS files and their respective secure hash files are signed using a pair of encryption keys for the OS image. In an embodiment, the signing may be performed by a CI/CD tool utilized to integrate or deliver application's code rather than to the cloud computing platform. As noted above, the public key or public certificate generated thereof may be saved to be used during the verification process. The private key is stored only in the client's CI/CD machine. It should be noted the ISD and C/CD machines are separate entities.

At optional S350, the cryptographic signed hashes are copied to the virtual machine instantiated in the sandbox environment in order to create a new OS image including the cryptographic hashes. Alternatively or collectively, the cryptographic signed hashes may be saved in the ISD 110.

Figure 4:
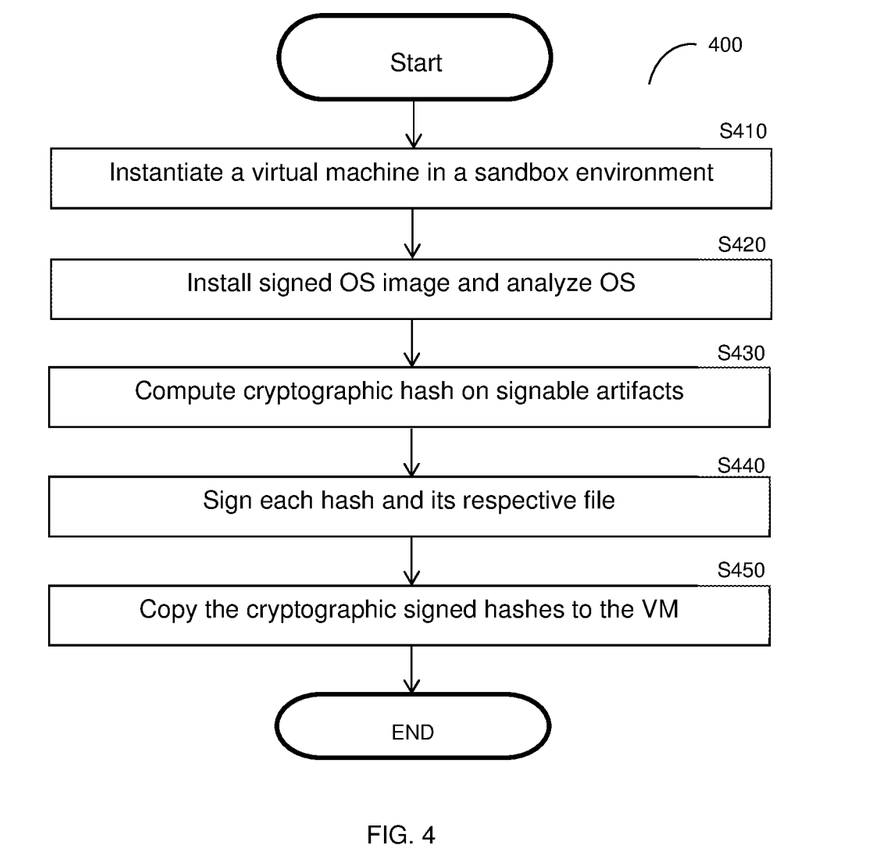
FIG. 4 is a flowchart illustrating a method for signing artifacts according to an embodiment.

FIG. 4 shows an example flowchart 400 illustrating a process for signing artifacts according to an embodiment.

At optional S410, a virtual machine is instantiated in a sandbox environment. It should be noted that if the virtual machine is already running in the sandbox environment, then S410 is not performed.

At S420, a signed OS image is installed on the virtual machine such that the execution of the respective OS can be analyzed. In an embodiment, the signed OS image is generated using the process described above with respect to FIG. 3. More specifically, the signed OS image is an OS image executed using one or more signed OS files. The analysis includes determining which artifacts can be signed. Example signable artifacts are discussed above.

At S430, a cryptographic hash is computed on each signable artifact. In an example embodiment, S430 may be performed using cryptographic hash functions, including secure hash algorithm (SHA), e.g., SHA-2, SHA-3, MD5, and the like.

At S440, the signed artifacts of the list of signed artifacts and their respective cryptographic hashes are signed using a pair of the signing encryption keys for the artifacts. In an embodiment, the signing may be performed by a CI/CD tool (such as, but not limited to, Jenkins, GitLab CI, Buildbot, etc.) utilized to integrate or deliver to the application not the cloud computing platform. As noted above, the public key or a certificate generated thereof may be saved for use during the verification.

At optional S450, the cryptographic hashes of the artifacts are copied to the virtual machine instantiated in the sandbox environment in order to create a new image of the virtual machine. Alternatively or collectively, the cryptographic hashes of the artifacts may be saved in the ISD 110, FIG. 1.

Figure 5:
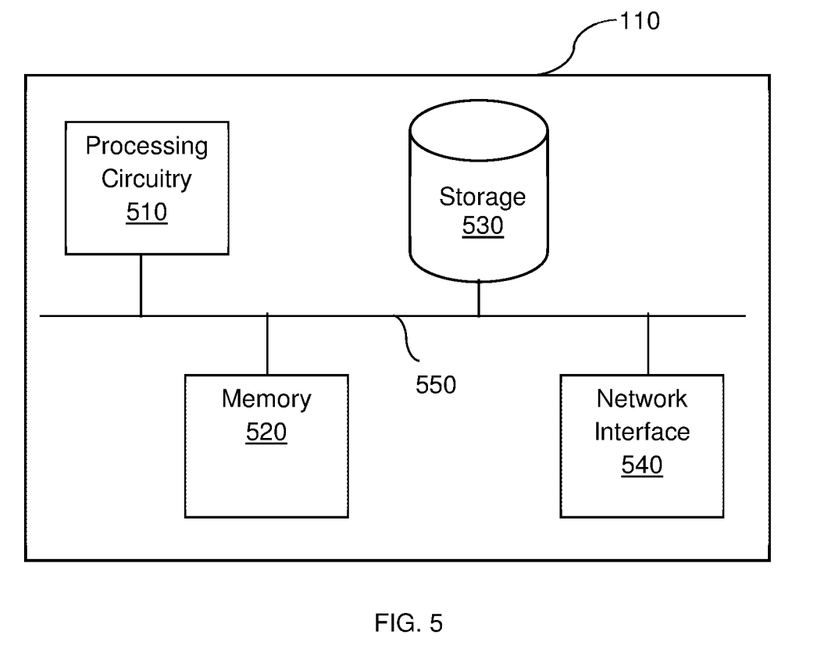
FIG. 5 is a schematic diagram of an identity signing device according to an embodiment.

FIG. 5 illustrates an exemplary schematic diagram of the ISD 110 according to an embodiment. The ISD 110 includes a processing circuitry 510 coupled to a memory 520, a storage 530, and a network interface 540. In an embodiment, the components of the ISD 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, and the like. Instructions may include code (e.g., in source code format, binary code format, executable code format, or any other suitable format of code). The instructions, when executed by the processing circuitry 510, cause the processing circuitry 510 to perform the various processes described herein. Specifically, the instructions, when executed, cause the processing circuitry 510 to generate fleet behavior models and detect anomalous behavior in fleets or sub-fleets as described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the ISD 110 to communicate with the artifacts database 120, external systems 140, and the cloud computing platform 130.

It should be understood that the embodiments described herein are not limited to the specific architecture illustrated in FIG. 5, and other architectures may be equally used without departing from the scope of the disclosed embodiments.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing instantiates, comprising:
   determining at least one signable file among a plurality of files of an instantiate, wherein determining the at least one signable file further comprises classifying each of the plurality of files with respect to whether the file is changed at runtime;
   signing each of the at least one signable file to create at least one first signature, wherein signing the plurality of files further comprises computing a cryptographic hash for each file, wherein each cryptographic hash is signed using a private key; and
   verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

2. The method of claim 1, wherein the at least one signable file includes at least one operating system file, wherein the at least one operating system file is of an operating system image of a virtual machine that would execute the instantiate.

3. The method of claim 2, wherein the operating system image corresponds to an operating system, wherein determining the at least one signable file further comprises:
   installing the operating system image in the virtual machine; and
   analyzing execution of the operating system, wherein each of the at least one operating system file is classified based on the analysis.

4. The method of claim 3, wherein each of the at least one signable file is any of: changed at least a threshold number of times during execution of the operating system, and allowed to be changed during execution of the operating system.

5. The method of claim 1, wherein the at least one signable file includes at least one artifact.

6. The method of claim 5, wherein determining the at least one signable file further comprises:
   installing a signed operating system image, wherein the signed operating system image corresponds to an operating system, wherein the at least one artifact is associated with the operating system; and
   analyzing execution of the operating system, wherein each of the at least one artifact is classified based on the analysis.

7. The method of claim 6, wherein signed operating system image is executed using at least one signed operating system file, wherein each of the at least one signed operating system file is one of the plurality of files that is classified as signable.

8. The method of claim 1, wherein the plurality of files is classified based on at least one of: software packages received from external systems, a library defining types of files, executable permissions of the plurality of files, and whether each of the plurality of files was opened for reading or for writing.

9. The method of claim 1, wherein the plurality of files is signed offline, wherein the identity of the instantiate is verified at runtime.

10. A non-transitory computer readable medium having stored thereon instructions for causing a processing circuitry to execute a process, the process comprising:
    determining at least one signable file among a plurality of files of an instantiate, wherein determining the at least one signable file further comprises classifying each of the plurality of files with respect to whether the file is changed at runtime;
    signing each of the at least one signable file to create at least one first signature, wherein signing the plurality of files further comprises computing a cryptographic hash for each file, wherein each cryptographic hash is signed using a private key; and
    verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

11. A system for securing instantiates, comprising:
    a processing circuitry; and
    a memory, the memory containing instructions that, when executed by the processing circuitry, configure the system to:
    determining at least one signable file among a plurality of files of an instantiate, wherein determining the at least one signable file further comprises classifying each of the plurality of files with respect to whether the file is changed at runtime;
    signing each of the at least one signable file to create at least one first signature, wherein signing the plurality of files further comprises computing a cryptographic hash for each file, wherein each cryptographic hash is signed using a private key; and
    verifying an identity of the instantiate using the at least one first signature, wherein verifying the identity of the instantiate further comprises comparing the at least one first signature to the at least one second signature, wherein each of the at least one second signature is a signature of one of the at least one signable file at runtime.

12. The system of claim 11, wherein the at least one signable file includes at least one operating system file, wherein the at least one operating system file is of an operating system image of a virtual machine that would execute the instantiate.

13. The system of claim 12, wherein the operating system image corresponds to an operating system, wherein the system is further configured to:
   install the operating system image in the virtual machine; and
   analyze execution of the operating system, wherein each of the at least one operating system file is classified based on the analysis.

14. The system of claim 13, wherein each of the at least one signable file is any of: changed at least a threshold number of times during execution of the operating system, and allowed to be changed during execution of the operating system.

15. The system of claim 11, wherein the at least one signable file includes at least one artifact.

16. The system of claim 15, wherein the system is further configured to:
   install a signed operating system image, wherein the signed operating system image corresponds to an operating system, wherein the at least one artifact is associated with the operating system; and
   analyze execution of the operating system, wherein each of the at least one artifact is classified based on the analysis.

17. The system of claim 16, wherein signed operating system image is executed using at least one signed operating system file, wherein each of the at least one signed operating system file is one of the plurality of files that is classified as signable.

18. The system of claim 11, wherein the plurality of files is classified based on at least one of: software packages received from external systems, a library defining types of files, executable permissions of the plurality of files, and whether each of the plurality of files was opened for reading or for writing.

19. The system of claim 11, wherein the plurality of files is signed offline, wherein the identity of the instantiate is verified at runtime.

* * * * *